(12) United States Patent
Hamersley

(10) Patent No.: US 7,287,153 B1
(45) Date of Patent: Oct. 23, 2007

(54) PROCESSING OF PROCESSOR PERFORMANCE STATE INFORMATION

(75) Inventor: Richard Alan Hamersley, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 535 days.

(21) Appl. No.: 10/757,273

(22) Filed: Jan. 14, 2004

(51) Int. Cl.
*F06F 9/00* (2006.01)

(52) U.S. Cl. .............. 713/1; 713/2; 713/300; 713/320

(58) Field of Classification Search ............. 713/1–601
See application file for complete search history.

(56) References Cited

U.S. PATENT DOCUMENTS

| | | | | |
|---|---|---|---|---|
| 5,671,435 | A * | 9/1997 | Alpert | 712/38 |
| 5,835,775 | A * | 11/1998 | Washington et al. | 717/153 |
| 5,958,037 | A * | 9/1999 | Dreyer et al. | 712/32 |
| 2003/0120961 | A1* | 6/2003 | Cooper | 713/320 |
| 2004/0054936 | A1* | 3/2004 | Dwyer et al. | 713/300 |

OTHER PUBLICATIONS

Windows Platform Design Notes, Designing Hardware for the Microsoft® Windows® Family of Operating Systems, Windows Native Processor Performance Control, Version 1.1a-Nov. 12, 2002, 2001-2002 Microsoft Corporation, pp. 1-22. http://www.microsft.com/hwdev/tech/onnow/ProcPerfCtrl.asp.

Frank Bellosa, EndurIX, OS-Directed Throttling for Processor Activity for Dynamic Power Management, Technical Report, Jun. 1999, Computer Science Department, Operating Systems—IMMD IV, Friedrich-Alexander-University, Erlangen-Nürnberg, Germany, pp. 1-5.

Bios Interface Specification, Advanced Power Management (APM), Rev. 1.2, Feb. 1996, Intel Corporation, Microsoft Corporation, pp. 1-85.

Advanced Configuration and Power Interface Specification, Rev. 2.0c, Aug. 25, 2003, Compaq Computer Corp., Intel Corp., Microsoft Corp., Phoenix Technologies Ltd., Toshiba Corp., pp. 1-518.

OnNow Power Management Architecture for Applications, Microsoft Windows, http://www.microsoft.com/whdc/hwdev/tech/onnow/onnowapp.mspx?pf=true, Dec. 4, 2001, pp. 1-10.

OnNow Device Power Management, Microsoft Windows, http://www.microsoft.com/whdc/hwdev/tech/onnow/devicepm.mspx?pf=true, Dec. 4, 2001, pp. 1-5.

* cited by examiner

*Primary Examiner*—Rehana Perveen
*Assistant Examiner*—Paul Yanchus
(74) *Attorney, Agent, or Firm*—Zagorin O'Brien Graham LLP

(57) ABSTRACT

A basic input/output system (BIOS) evaluates a plurality of performance state data that is stored in a disposable memory to determine if one of the plurality matches a set of processor criteria, which correspond to a processor of the computer system. Each of the plurality of performance state data corresponds to one or more processors. The BIOS selects the one of the plurality that matches the criteria to some degree (e.g., exactly, nearly, etc.) and stores it in BIOS runtime memory. If there are no matches, then the BIOS may select a default performance state table or dynamically generate a performance state table.

29 Claims, 6 Drawing Sheets

PROCESSING OF PROCESSOR PERFORMANCE STATE INFORMATION

BACKGROUND

1. Field of the Invention

This invention relates to computer systems and more particularly to aspects of power management and BIOS.

2. Description of the Related Art

Computing systems are information handling systems which are designed to give independent computing power to one or more users. Computing systems can be found in many forms including, for example, mainframes, minicomputers, workstations, servers, personal computers, internet terminals, notebooks and embedded systems. Personal computer (PC) systems include desk top, floor standing, or portable versions. A typical PC system is a microcomputer that includes a microprocessor, associated memory and control logic (typically on a system board) and a number of peripheral devices that provide input and/or output (I/O) for the system.

Computing systems typically include a set of built-in software routines called the basic input/output system (BIOS). The BIOS is a software interface between the system hardware and the operating system software. The BIOS facilitates programmer and user interaction with the system hardware. The BIOS is often referred to as firmware. Like software, the BIOS is a set of instructions to the computer's microprocessor. The BIOS is commonly coded using, for example, assembly language, and stored onto a non-volatile memory such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS.

The BIOS controls several important functions of personal computer systems. For instance, the BIOS performs various functions at power up, including testing and initializing memory, inventorying and initializing the system, and testing the system. These functions at power up are referred to as "system boot" or "booting the system" and can occur every time the system powers up or is reset. One part of power up is referred to as Power On Self Test (POST). The POST routines include testing various aspects of the system.

The BIOS also controls keystroke interpretation, display of characters, and communication via the PC ports. The operating system and application programs of a computer system access the BIOS rather than directly manipulating I/O ports, registers and control words of the specific system hardware. BIOS can be accessed through an interface of software interrupts and contains a plurality of entry points respectively corresponding to the different interrupts.

Another function supported by BIOS relates to processor performance states. Microprocessors utilized in mobile applications, i.e., those used in battery powered systems, are particularly sensitive to power considerations. That is in part due to the small, densely packed system construction that limits the ability of the mobile computer system to safely dissipate the heat generated. A particular processor may operate at a number of different performance levels to achieve power management goals.

Appropriately monitoring and controlling the processor's operating parameters is important to optimizing the computer's performance, power consumption, and in the case of a portable or notebook computer, battery life. One of the current power management techniques utilized provides a computer system that has multiple performance states. The computer system determines an appropriate performance state based on system utilization or other information, such as temperature or battery life, and adjusts the performance of the system accordingly. Each performance state is made up of a particular voltage and operating frequency. The performance states may be stored in performance state tables, which specify a plurality of voltage and frequency combinations for a particular processor. In one approach, e.g., the PowerNow!™ technology from Advanced Micro Devices, a driver utilizes the performance state tables to dynamically change performance states and saves power by operating only as fast as required by the current system utilization.

The BIOS programmer has to manually build each performance state table from information provided, e.g., in processor data sheets. Because BIOS typically has to support several different processors over the life of a product, many performance state tables may be included in a BIOS version. However, certain performance states supported by one processor may not be supported by another processor. In fact, processors may be nominally the same but be built by slightly different processes resulting in different voltages and frequencies being supported. It is undesirable to revise BIOS frequently to support additional performance states. On the other hand it is may be unwieldy for BIOS to support large numbers of performance states.

Accordingly, it would be desirable to provide a way for BIOS to effectively handle a large number of performance states without affecting runtime resources. In addition, it would be desirable to be able to suitably support a processor when none of the performance state tables in BIOS match the processor in the system.

SUMMARY

Storing multiple performance state tables for various processors in a disposable memory segment and storing one of the multiple performance state tables in a runtime memory segment, allows the performance state table footprint in runtime memory to be reduced while facilitating a BIOS that supports multiple processors. The performance state table stored into the runtime memory segment satisfies to some degree one or more criteria that correspond to the processor of the system in which the BIOS resides. However, some embodiments of the invention provide for a default performance state table or provide for dynamic generation of a performance state table, typically when a performance state table in the disposable memory segment does not satisfy the processor criteria.

According to some embodiments of the invention, a method of operating a computer system comprises determining if any performance state data stored in the computer system in a first area of memory specifying performance states for a plurality of processors is associated with a processor being utilized in the computer system. The method also comprises copying the portion of the performance state data into a second area of memory if a portion of the performance state data is found to be associated with the processor being utilized in the computer system.

According to some embodiments of the invention, a computer program product stored on computer readable medium is operable in a computer system to determine whether a match exists between a processor being utilized in the computer system and performance state information for a plurality of processors. In addition, the computer program product is operable to generate performance state data after no match is found to exist.

According to some embodiments of the invention, an apparatus comprises means for determining if any performance state data specifying performance states for a plurality of processors, which is stored in a first area of memory of a computer system utilized for system boot, is associated with a processor being utilized in the computer system. The apparatus also comprises means for copying a portion of the performance state data into a second area of memory if the portion of the performance state data is found to be associated with the processor being utilized in the computer system.

According to some embodiments of the invention, an apparatus comprises means for evaluating information in a plurality of performance state tables, each of the performance state tables having information relating to a performance state of a processor. The apparatus also comprises means for determining if a near match exists and utilizing one of the performance state tables that is a near match to the processor if the near match exists, if a match is not found between one of the performance state tables and a processor being utilized in the computer system.

According to some embodiments of the invention, an apparatus comprises means for determining if any performance state data stored in the computer system specifying performance states for a plurality of processors is associated with a processor being utilized in the computer system. The apparatus also comprises means for generating performance state data if none of the performance state data is associated with the processor being utilized in the computer system.

According to some embodiments of the invention, a computer program product stored on computer readable medium operable in a computer system to copy one of a plurality of performance state data associated with respective processors from a disposable memory segment into a runtime memory segment. The computer program product is also operable to generate an advanced configuration and power interface object based at least in part on the copied performance state data.

According to some embodiments of the invention, a computer system comprises memory that hosts a basic input/output system (BIOS) that selects a first of a plurality of performance state information from a first area of memory into a second area of memory. The first area of memory is to be utilized during power on self test (POST) processing by the BIOS, and the second area of memory is to be used for a runtime memory segment of BIOS. The computer system also comprises a processor coupled with the memory.

These and other aspects of the described invention will be better described with reference to the Detailed Description and accompanying Figures.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The description that follows includes exemplary systems, methods, techniques, and data structures that embody techniques of the present invention. However, it is understood that the described invention may be practiced without these specific details. In other instances, well-known protocols, structures and techniques have not been shown in detail in order not to obscure the invention.

Figure 1A:
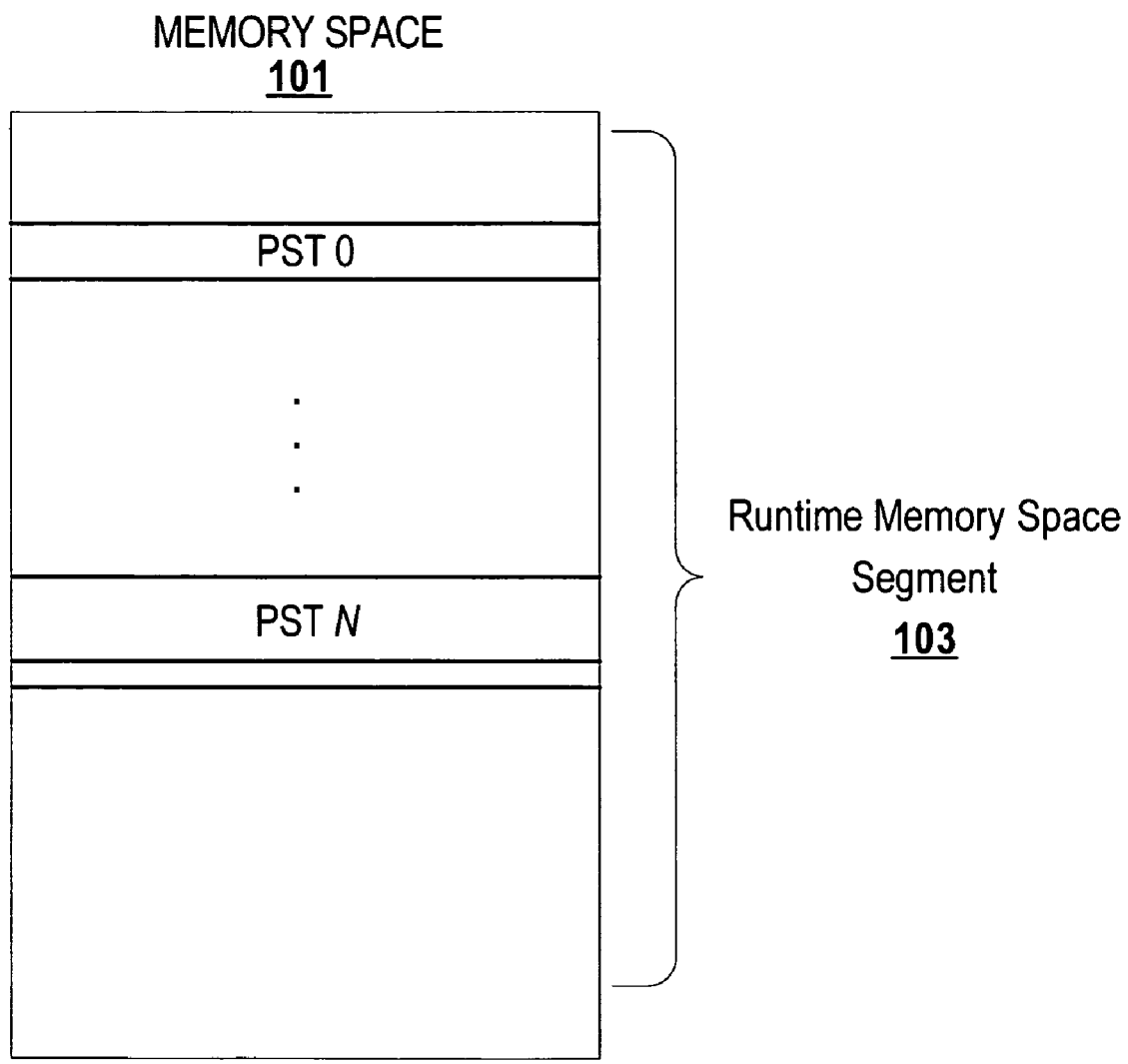
FIG. 1A illustrates performance state tables hosted in runtime memory segment according to realizations of the invention.

FIG. 1A illustrates performance state tables hosted in runtime memory segment according to realizations of the invention. In FIG. 1A, a memory space 101 includes a runtime memory space segment 103. The runtime memory space segment 103 hosts multiple performance state tables (PSTs). For example, the runtime memory space segment 103 is 64 kilobytes of memory space, identified as a segment 0xF000. A BIOS can load multiple PSTs into the runtime memory space segment, thus allowing a single BIOS to support various processors that correspond to the PSTs. The BIOS selects the appropriate one of the loaded PSTs for the host processor and modifies the other PSTs in order to avoid using them (e.g., scrambling the headers of the PSTs).

Figures 2, 3, 4:
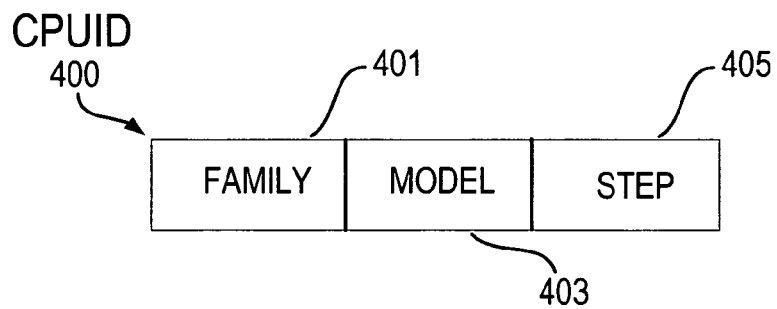
FIG. 2 illustrates an exemplary performance state block according to realizations of the invention.
FIG. 3 illustrates an exemplary performance state table according to some realizations of the invention.
FIG. 4 illustrates an exemplary CPUID field according to realizations of the invention.

FIG. 3 illustrates an exemplary performance state table according to some realizations of the invention. A PST 300 includes a header 301, which includes a CPUID field, MaxFID field, StartVID field, and a front side bus (FSB) clock speed field. The FSB clock speed field refers to the speed of a clock utilized by an external bus coupled to the processor. The processor may use that clock to generate internal clock signals. The FID (frequency identifier) fields represent the processor clock frequency multipliers The V fields indicate voltages that correspond to the processor. The speed of the processor clock is determined by multiplying the FSB clock by the multiplier represented by the current FID value. The MaxFID field indicates the highest clock multiplier at which the processor can operate, and the StartVID field indicates a coded value that corresponds to the processor voltage. The CPUID field identifies a processor that corresponds to the associated PST. In addition, the PST 300 includes a plurality of voltage and frequency combinations 303 that together specify a performance state for the processor. The frequencies may be represented as FIDs in the PST as illustrated in the drawing.

FIG. 4 illustrates an exemplary CPUID field according to realizations of the invention. A CPUID field 400 includes a family field 401, a model field 403, and a step field 405. The family field 401 indicates a processor family (e.g., AMD-K6®, AMD Athlon, AMD Athlon 64, AMD Opteron, etc.). The model field 403 indicates a processor model (e.g., FX, XP, MP, etc.). The step field 405 indicates stepping bits, which represents a step or revision of a die. The CPUID field illustrated in FIG. 4 is illustrative and not meant to be limiting upon the invention. Various realizations of the invention include fewer fields or less fields than illustrated in FIG. 4 (e.g., an extended family field).

If multiple PSTs are placed in the runtime memory segment, a single BIOS can support multiple processors. Supporting multiple processors with a single BIOS reduces maintenance burdens and increases efficiency of product maintenance and production. However, consumption of valuable memory space in the runtime memory segment, which is limited in size, can be reduced while still supporting different processors. In various realizations of the invention, a BIOS performs varying levels of screening of PSTs for multiple processors. Varying levels of screening reduces the amount of the runtime memory segment consumed by PSTs.

In some embodiments of the invention, a BIOS loads multiple PSTs into a "throw away" or disposable memory segment. The BIOS screens the throw away memory segment for an appropriate PST. The BIOS constructs a simple single-PST performance state block (PSB) at the appropriate address boundary in a runtime memory space segment. FIG. 2 illustrates an exemplary performance state block according to realizations of the invention. A performance state block 200 includes multiple performance state tables (PSTs) as well as a PSB header. The PSB header indicates information that aids in navigating the PSTs. In this example, the PSB header is a 16 byte header. The exemplary 16 byte header includes a PSB signature (e.g., character string that identifies the BIOS), a table version, flags (e.g., indicating mobile, desktop, etc.), settling time, reserved, and an indication of the total number of PSTs in the PSB. Various realizations include implement a PSB differently (e.g., information in the exemplary PSB header is separate from a grouping of PSTs, more or less information is included in the PSB header, the PSB header may be a different size, etc.).

The appropriate PST will match a set of parameters corresponding to the host processor. For example, those parameters include the CPUID, MaxFID, StartVID, and FSB clock speed. Other embodiments may utilize other parameters in place of, or in addition to those named.

If a match is found with a PST in the throw away segment, the BIOS copies that PST's information to the single PST runtime PSB. Screening available PSTs that are stored in a throw away memory segment for a parameter matching PST reduces the footprint for supporting a PSB in the runtime memory significantly. To illustrate the reduction, in some embodiments of the invention, the memory footprint can be reduced from over 500 bytes to a fixed size of only 56 bytes. The 56 byte footprint supports up to 16 power states (at 2 bytes per power state). By placing the available PSTs in the throw away memory segment, a BIOS can support a large number of pre-defined PSTs without consuming valuable memory space in runtime memory space segment.

In some embodiments, the PST support code and tables are located in the throw away memory segment of the BIOS that is only available during power-on self-test (POST). The POST is a period of time during which BIOS initializes and tests the hardware resources of a personal computer.

Figure 1B:
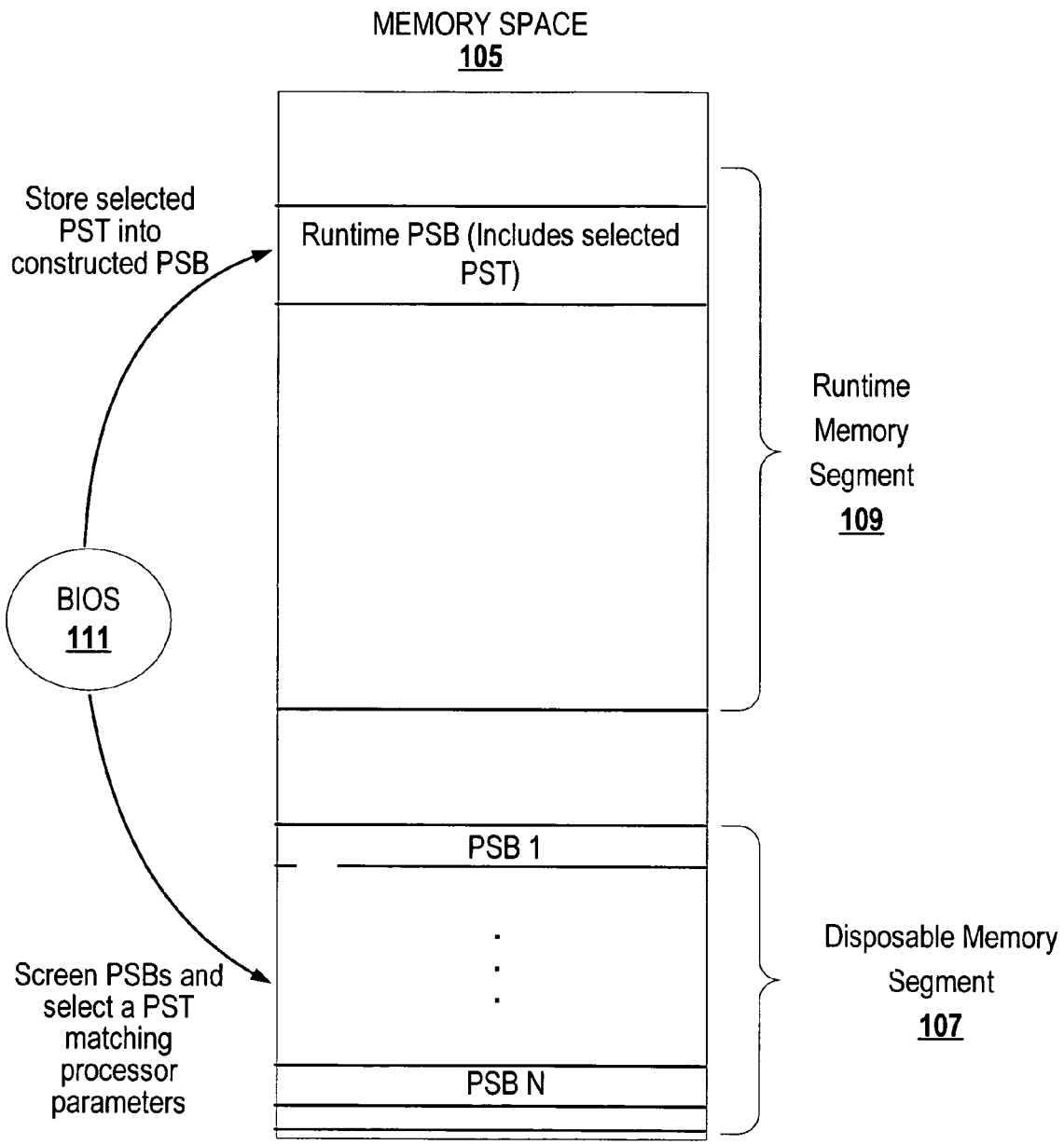
FIG. 1B illustrates a runtime memory space segment hosting a PSB with a selected PST according to realizations of the invention.

FIG. 1B illustrates a runtime memory space segment hosting a PSB with a selected PST according to realizations of the invention. A memory space 105 includes a disposable memory segment 107 and a runtime memory segment 109. The disposable memory segment 107 may include multiple PSBs. A BIOS 111 screens the PSBs in the disposable memory segment 107 and selects a PST from the PSBs that matches a given set of processor parameters. The BIOS 111 stores the selected PST into a PSB constructed in the runtime memory segment 109. The BIOS may construct the runtime PSB before selecting a matching PST, after selecting a matching PST, etc. In some embodiments, the PSTs are split into two basic groups—PSTs for mobile processors and PSTs for low-power or small form factor (SFF) desktop processors. The small form factor processors are low-power desktop processors. For example, one PSB in disposable memory includes PSTs for mobile processors and another PSB includes PSTs for SFF processors. The mobile PSTs may also be split into various groups corresponding, e.g., to low-voltage (e.g. <1.2V core voltage) processors and regular mobile processors.

Separating PSTs into PSBs facilitates partitioning groups of PSTs according to some design criteria. In scanning for a parameter matching PST, in some embodiments, the BIOS determines which PSB is appropriate for the platform and scans through the multiple PSTs in that PSB looking for a PST that exactly matches the processor parameters. For example, a low voltage mobile PSB may be provided that includes PSTs that are utilized by low voltage mobile processors. When BIOS searches for an appropriate PST, that low voltage mobile processor PSB is the only PSB searched if the platform in which BIOS resides supports low voltage processors. Various realizations of the invention base selection of a PSB on various criteria (e.g., revision of a northbridge chip in a chipset).

In some embodiments, there is only one PSB in the disposable memory segment that contains all of the pre-defined PSTs. Alternatively, the BIOS may search all PSBs. After a match is found, the BIOS constructs a PSB block in the space-limited runtime area of the BIOS that contains only the PST that matches the processor being utilized in the system. As stated above, this reduces the footprint required for PSTs in the runtime area of BIOS since only a single PST is placed in the runtime memory segment. Note that other appropriate data structures may also be used to store performance state information instead of PSBs or PSTs. Furthermore, a BIOS may select multiple PSTs to load into the runtime PSB.

Figure 5:
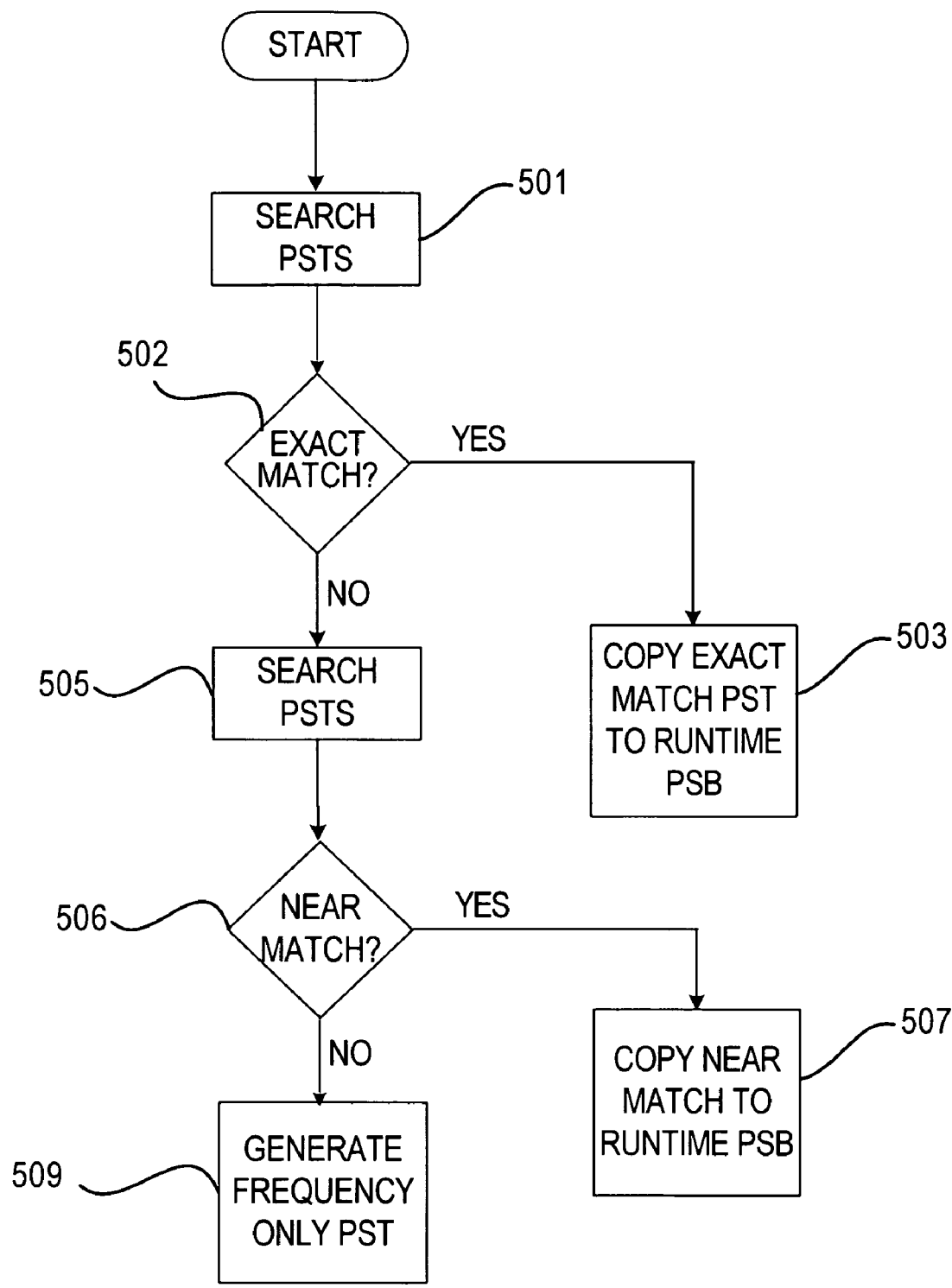
FIG. 5 illustrates an exemplary flowchart for storing a PST according to some realizations of the invention.

If, however, an exact match is not found, the BIOS can determine if a "near match" exists. FIG. 5 illustrates an exemplary flowchart for storing a PST according to some realizations of the invention. A search of the PSTs for an exact match, as described above, is performed in 501. If an exact match is found, the PST that is the exact match is copied over into the runtime memory segment in 503. If an exact match is not found, the PSTs are again searched in 505, except for this pass, the compare algorithm determines if a near match exists between the processor (or processors) being utilized in the system and the PST header. In some embodiments of the invention, a near match is defined as a match in which the stepping bits in the CPUID are ignored. Thus, even if an exact match cannot be found, a near match can be utilized. If a near match is found, then the near match PST is copied over to the runtime memory segment in 507. Use of a near match simplifies BIOS maintenance in that it is not critical that BIOS be updated for each processor change if the change simply involves the stepping bits.

Even if no near match exists, in some circumstances, BIOS can automatically generate the PST. Note that for certain processors, e.g., small form factor processors utilized in low power desktop implementations, the power states utilize a constant voltage and vary only the frequency. This means that the PST for such a processor includes only variable frequency information. The PST can be automatically generated because the PST is constructed in runtime memory. That is especially true of PSTs that only include variable frequency. Generating PSTs automatically when an exact match is not found allows support for processors even if a matching PST cannot be found.

Referring to FIG. 5, an exemplary flow diagram illustrates automatic generation of a PST. If at 502 an exact match was not found, and if at 506 a near match was not found, the BIOS can automatically generate a frequency only PST in 509 in the runtime memory segment. In some embodiments, a PST is automatically generated by determining the upper and lower bounds of the frequency and then generating an appropriate number of intermediate frequencies spaced at appropriate intervals.

For example, the lower bound for a particular system may be 5 times the FSB clock speed. The lower bound may be determined according to the type of system or processor, or may be information available in the processor or system directly. The upper bound is indicated by the MaxFID field or from some other information provided in the processor or system. The intermediate frequencies may be spaced equally between the upper and lower bound, or according to some other metric. Once the upper bound, lower bound, and intermediate frequencies have been determined, the BIOS can build the PST in the runtime memory segment. Thus, processors can be supported even if the BIOS has not been updated to specifically support that processor. Although FIG. 5 illustrates automatic generation of PSTs subsequent to checking for an exact match and a near match, in some embodiments, automatic generation of PSTs may follow a different flow (e.g., after checking for an exact match and recognizing an SFF platform).

While changing performance states may be supported in drivers in certain embodiments, in other embodiments, the operating system (e.g. Windows XP™) requires Advanced Configuration and Power Interface (ACPI) objects to support changing between various performance states. One approach to such a scenario is to provide separately maintained PSTs and ACPI objects. However, another approach is for these objects to be dynamically generated during POST rather than appearing statically in memory, which can potentially make special methods unnecessary, since static objects require a complex set of methods to figure out which table in the ACPI space to use. The memory footprint for the static implementation is also much larger, however the footprint size is not the major consideration that it is with PST tables in runtime BIOS memory since ACPI memory space is typically at or near the top of installed system memory, above the 1 MB address. Accesses to ACPI memory space are not constrained to the 64-Kbyte segment size of the runtime PSB. The ACPI memory space is practically limitless, so the BIOS developer is not as limited as with the memory space for the runtime PSB.

Figure 6:
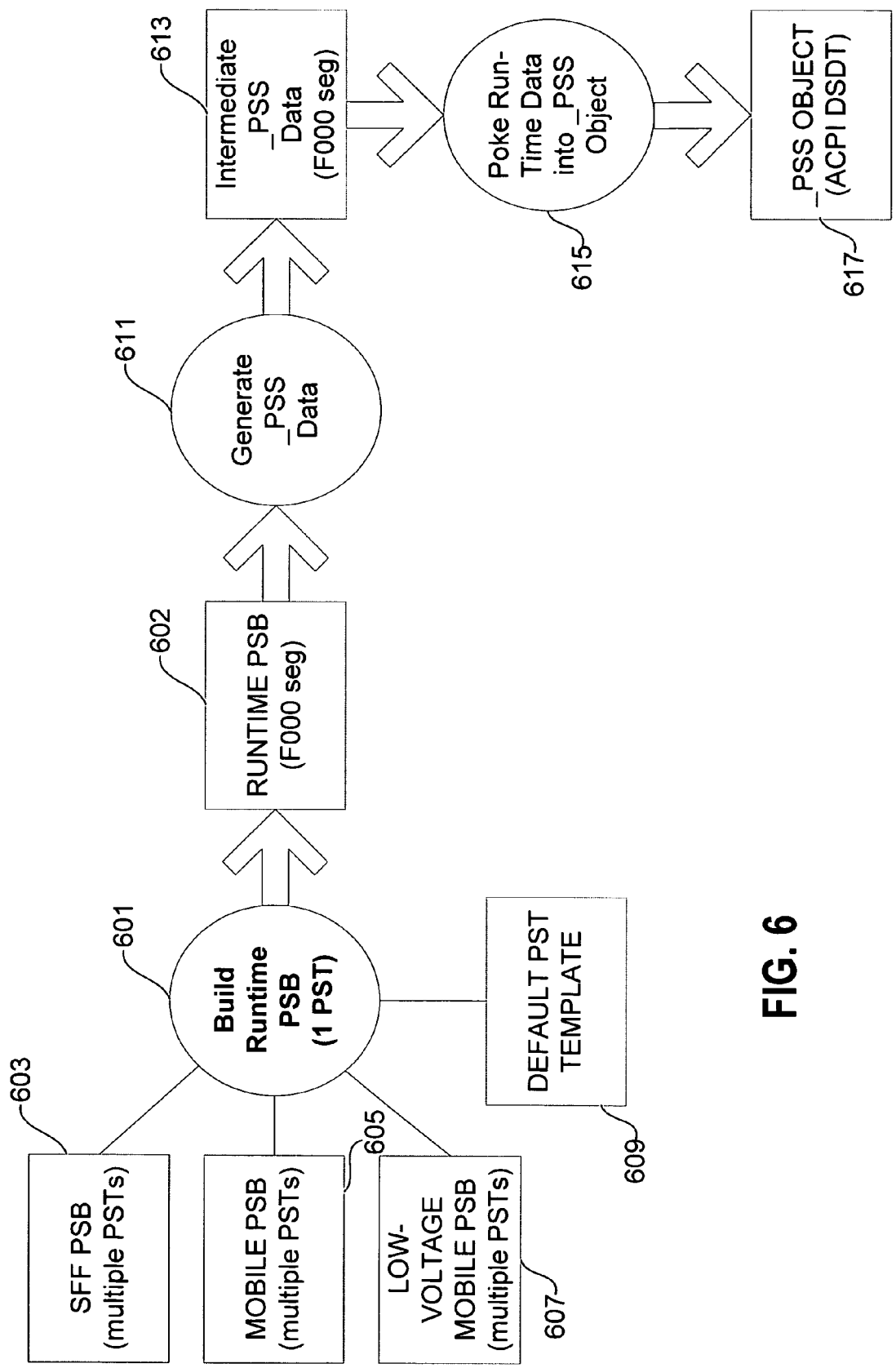
FIG. 6 illustrates a conceptual diagram of a BIOS dynamically generating ACPI objects according to some realizations of the invention.

FIG. 6 illustrates a conceptual diagram of a BIOS dynamically generating ACPI objects according to some realizations of the invention. The BIOS first builds in 601 a runtime PSB data structure 602 having a single PST as described above. The build in 601 uses as inputs a small form factor PSB 603, a mobile PSB 605, a low voltage mobile PSB 607, and/or a default PST template 609 as appropriate for the platform. The BIOS build in 601 is performed during POST and data structures 603-609 are static structures in the throw away memory segment. The default PST template 609 is a table of processor VID codes sorted by clock multiplier value from lowest to highest. The default PST template 609 includes two columns: a first column includes whole number clock multipliers (e.g., 3×, 4×, 5×, 6×, etc.); and a second column includes fractional clock multipliers (e.g., 5.5×, 6.5×, 10.5×, etc.). Various realizations of the invention utilize values in either or both columns. The BIOS defines a _PSS object containing a number of (e.g. five) power states (P0, . . . , P4). The ACPI 2.0 specification defines the _PSS object as an optional object that indicates a variable number of supported processor performance states. Additional details about the object are provided in section 8.3.3.2 of the ACPI specification. In some embodiments of the invention, the _PSS object is a fixed size object and the number of performance states is determined by the BIOS programmer at BIOS build time. The number of pre-defined performance states is independent of the actual number of performance states in the PST that supplies the performance state information. Those five power states are mapped to five of the power states in the runtime PST. In some embodiments of the invention, the BIOS dynamically constructs the _PSS object, hence the number of performance states in the dynamically constructed _PSS object can be the same as the number of performance states in the corresponding PST. The data for each _PSS state is then generated from information in the PST header and from the mapped power state in the runtime PST in 611. While in some embodiments an intermediate _PSS object is generated (e.g., for programming convenience), in other embodiments generation of the intermediate _PSS object is skipped. Finally the BIOS pokes valid _PSS data in 615 into the actual ACPI_PSS object to generate the ACPI_OBJECT 617. Various realizations of the invention will generate a different ACPI object in accordance with the ACPI specification (e.g., a differentiated system description table (DSDT) may include the _PSS object; a secondary system description table (SSDT) may include the _PSS object, etc.). Generating ACPI objects, as described, facilitates efficient updating of ACPI objects by adding new PSTs.

Note that mapping of the runtime PST data into a pre-defined number of power states requires selectively including a subset of the available power states. Such selective inclusion can be implemented in a number of ways. Generally, the goal is to determine the maximum and minimum power state and fill the middle with power states spaced approximately evenly between the maximum and minimum.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 7:
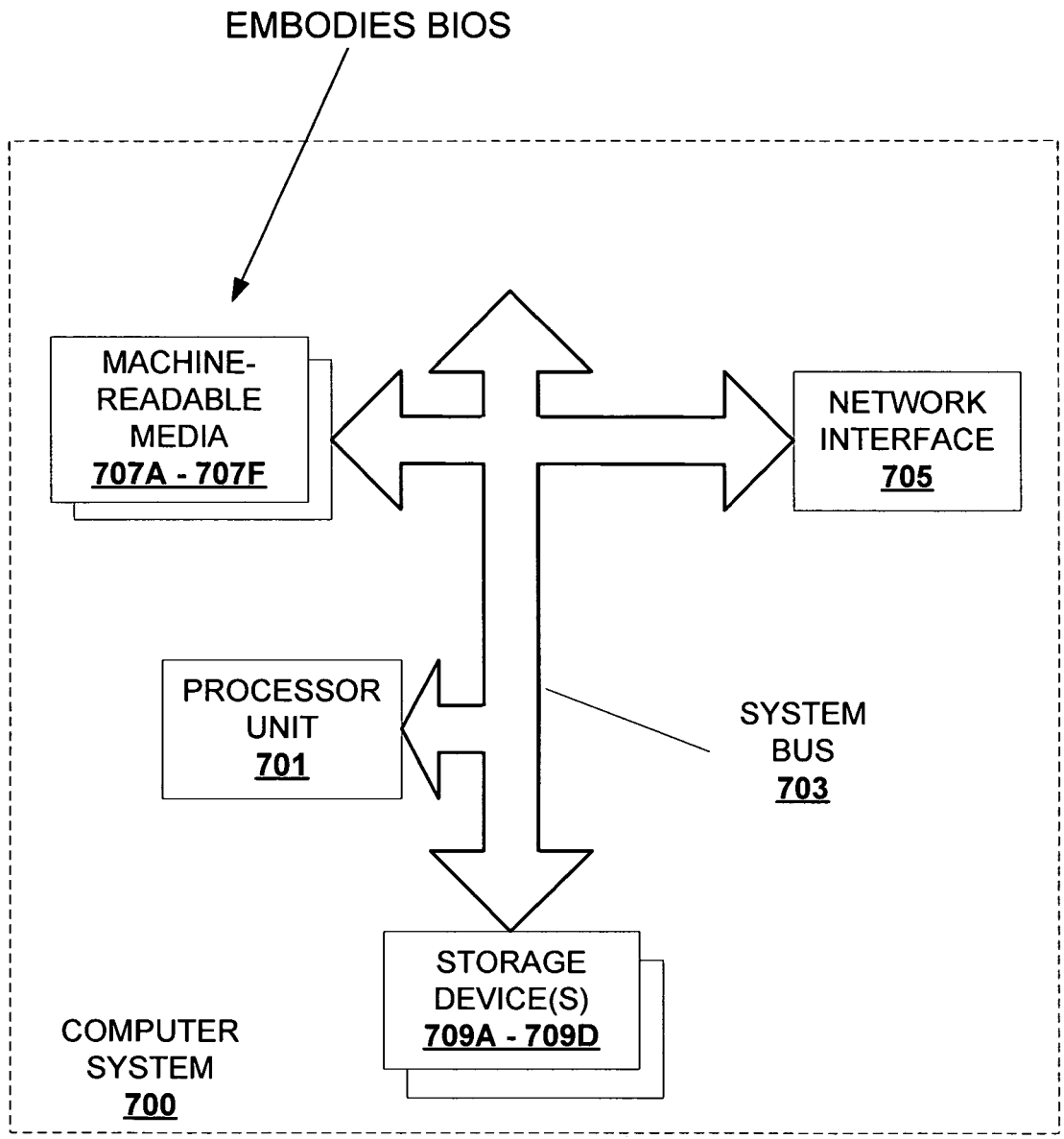
FIG. 7 depicts an exemplary computer system according to some realizations of the invention.

FIG. 7 depicts an exemplary computer system according to some realizations of the invention. A computer system 700 includes a processor unit 701 (possibly including multiple processors). The computer system 700 also includes a system memory 707A-707F (e.g., one or more of cache, SRAM DRAM, RDRAM, EDO RAM, DDR RAM, EEPROM, etc.), a system bus 703 (e.g., LDT, PCI, ISA, etc.), a network interface 705 (e.g., an ATM interface, an Ethernet interface, a Frame Relay interface, etc.), and a storage device(s) 709A-709D (e.g., optical storage, magnetic storage, etc.). Realizations of the invention may include fewer or additional components not illustrated in FIG. 7 (e.g., video cards, audio cards, additional network interfaces, peripheral devices, etc.). The processor unit 701, the storage device(s) 709A-709D, the network interface 705, and the system memory 707A-707F are coupled to the system bus 703. The system memory 707A-707F depicted in FIG. 7 embodies a BIOS in accordance with the preceding description. For example, the embodied BIOS selects a PST from disposable memory and stores it in a runtime PSB. Although, the system memory 707A-707D is depicted as coupled with the system bus, one or more of the system memory 707A-707F may have a more direct connection with the processor 701 (e.g., DMA channel, on-chip, etc.).

While circuits and physical structures are generally presumed, it is well recognized that in modern semiconductor and design fabrication, physical structures and circuits may be embodied in computer readable descriptive form suitable for use in subsequent design, test, or fabrication stages as well as in resultant fabricated semiconductor integrated circuits. Accordingly, claims directed to traditional circuits or structure may, consistent with particular language thereof, read upon computer readable encodings and representations of same, whether embodied in media or combined with suitable reader facilities to allow fabrication, test, or design refinement of the corresponding circuits and/or structures.

The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A method of operating a computer system comprising:
   determining if any performance state data stored in the computer system in a first area of memory specifying performance states for a plurality of processors is associated with a processor being utilized in the computer system;
   if a portion of the performance state data is found to be associated with the processor being utilized in the computer system, copying the portion of the performance state data into a second area of memory; and
   if a portion of the performance state data is not found to be associated with the processor being utilized in the computer system, determining if a near match exists between a portion of the performance state data and the processor being utilized in the computer system.

2. The method as recited in claim 1 where the performance state data is stored in performance state tables.

3. The method as recited in claim 1 wherein the method is performed in a portion of basic input output system (BIOS) and wherein the first area of memory is a memory segment utilized during power on self test (POST) processing by BIOS and wherein the second area of memory is a runtime memory segment of BIOS.

4. The method as recited in claim 3, wherein the runtime memory segment starts at address 0xF000.

5. The method as recited in claim 1 wherein when the portion of the performance state data is found to be associated with the processor being utilized in the computer system, CPUID information associated with the portion of the performance state data matches CPUID information in the processor.

6. A method of operating a computer system comprising:
   determining if any performance state data stored in the computer system in a first area of memory specifying performance states for a plurality of processors is associated with a processor being utilized in the computer system;
   if a portion of the performance state data is found to be associated with the processor being utilized in the computer system, copying the portion of the performance state data into a second area of memory; and
   generating performance state data if none of the performance state data is associated with the processor being utilized in the computer system and a near match does not exist.

7. A method of operating a computer system comprising:
   evaluating information in a plurality of performance state tables, each of the performance state tables having information relating to a performance state of a processor; and
   if a match is not found between one of the performance state tables and a processor being utilized in the computer system, determining if a near match exists and utilizing one of the performance state tables that is a near match to the processor if the near match exists.

8. The method as recited in claim 7, wherein determining if a near match exists comprises ignoring a stepping field in a CPUID field in the one of the performance state tables that is the near match to the processor.

9. The method as recited in claim 7, wherein the plurality of performance state tables are in a first area of memory, and if the near match is found, copying the information from the one of the performance state tables into a second area of memory, and wherein the first area of memory is a memory segment utilized during power on self test (POST) processing by basic input/output system (BIOS) and wherein the second area of memory is a runtime memory segment of the BIOS.

10. The method as recited in claim 7, further comprising:
    if a match is not found between one of the performance state tables and a processor being utilized in the computer system, and if the near match is determined not to exist, generating performance state data based on, at least in part, information provided in the processor.

11. A method of operating a computer system comprising:
    determining if any performance state data stored in the computer system specifying performance states for a plurality of processors is associated with a processor being utilized in the computer system; and
    generating performance state data if none of the performance state data is associated with the processor being utilized in the computer system.

12. The method as recited in claim 11, further comprising generating performance state data for the processor being used in the computer system after determining that a near match does not exist.

13. The method as recited in claim 11, wherein the generating the performance state data further comprises generating performance state information including a plurality of frequency values and a fixed voltage value.

14. The method as recited in claim 13, wherein an upper limit of frequency of the frequency values is determined according to an indication of maximum frequency provided in the processor.

15. The method as recited in claim 14, wherein the plurality of frequency values are spread approximately evenly between a lower limit and the upper limit.

16. A computer program product stored on computer readable medium operable in a computer system to:

determine whether a match exists between a processor being utilized in the computer system and performance state information stored in a first area of memory;

if a match exists, copy matching performance state information into a second area of memory, wherein the first area of memory is a memory segment utilized during power on self test (POST) processing by basic input output system (BIOS) and wherein the second area of memory is a runtime memory segment of BIOS; and if no match is found to exist, generate performance state data after no match is found to exist between any of the performance state data and the processor being utilized in the computer system.

17. The computer program product as recited in claim 16, further comprising generating performance state data for the processor being used in the computer system after determining that a near match does not exist.

18. The computer program product as recited in claim 16, wherein the generating the performance state data further comprises generating a performance state table having a plurality of frequencies and in which processor voltage is fixed.

19. The computer program product as recited in claim 16, wherein an upper limit of the plurality of frequencies is determined in the generated performance state data according to an indication of maximum frequency in the processor and wherein the plurality of frequencies are spread approximately evenly between a lower limit and the upper limit.

20. A computer program product stored on computer readable medium operable in a computer system to:

determine whether a match exists between a processor being utilized in the computer system and performance state information stored in a first area of memory;

if a match exists, copy matching performance state information into a second area of memory, wherein the first area of memory is a memory segment utilized during power on self test (POST) processing by basic input output system (BIOS) and wherein the second area of memory is a runtime memory segment of BIOS; and determine if a near match exists and utilize performance information from performance state data that constitutes a near match to the processor if the near match exists and if the match is not found between any of the performance data and the processor being utilized in the computer system.

21. A computer program product stored on computer readable medium operable in a computer system to:

determine whether a match exists between a processor being utilized in the computer system and any of a plurality of performance state data associated with respective processors; and if a match is not found between any of the performance state tables and the processor being utilized in the computer system, the computer program product being operable to determine if a near match exists and utilize performance information from one of the performance state tables that is a near match to the processor if the near match exists.

22. The computer program product as recited in claim 21, wherein determining if a near match exists comprises ignoring a stepping field in a CPUID field and wherein if the near match exists, copying information from the near match data structure into the second memory area.

23. The computer program product as recited in claim 21, further comprising code operable to:

generate the performance state data based on information provided in the processor if a match is not found between any of the performance state tables and the processor being utilized in the computer system, and if the near match is determined not to exist.

24. A computer program product stored on computer readable medium operable in a computer system to:

determine whether a match exists between a processor being utilized in the computer system and performance state information for a plurality of processors; and generate performance state data after no match is found to exist.

25. The computer program product as recited in claim 24, wherein the generating of the performance state data further comprises generating frequency performance state data in which processor voltage is fixed and frequency changes.

26. The computer program product as recited in claim 24, wherein an upper limit of frequency is determined in the generated performance state data according to an indication of maximum frequency in the processor.

27. The computer program product as recited in claim 26, wherein frequency values in the performance state data are spread approximately evenly between a lower limit and the upper limit.

28. An apparatus comprising:

means for evaluating information in a plurality of performance state tables, each of the performance state tables having information relating to a performance state of a processor; and if a match is not found between one of the performance state tables and a processor being utilized in the computer system, means for determining if a near match exists and utilizing one of the performance state tables that is a near match to the processor if the near match exists.

29. An apparatus comprising:

means for determining if performance state data stored in the computer system specifying performance states for a plurality of processors is associated with a processor being utilized in the computer system; and means for generating performance state data if none of the performance state data is associated with the processor being utilized in the computer system.

* * * * *